UNITED STATES PATENT OFFICE.

GEORGE J. CLINE, OF GOSHEN, INDIANA.

PAINT.

SPECIFICATION forming part of Letters Patent No. 267,495, dated November 14, 1882.

Application filed June 3, 1882. (No specimens.)

*To all whom it may concern:*

Be it known that I, GEORGE J. CLINE, a citizen of the United States, resident of Goshen, in the county of Elkhart and State of Indiana, have invented a new and valuable Improvement in Paints; and I do hereby declare that the following is a full, clear, and exact description of the same.

This invention has relation to water-proof and fire-proof paint; and it consists in a composition of the ingredients hereinafter named, compounded in the manner and according to the proportions hereinafter set forth.

In mixing this paint composition I take metallic zinc reduced to powder, or any of its levigated compounds, to which I apply the term "zinc-gray," (an impure oxide of zinc, containing some carbonate of the same,) ten pounds; asbestus, ten pounds; silicate of soda, fifteen pounds; ground hematite iron ore, (or umber or ocher may be considered the equivalents of the ground hematite,) ten pounds; benzine, five gallons; shellac gum, three pounds; Burgundy pitch, two pounds; coal-tar, twenty gallons.

The zinc-gray above referred to is made from zinc salts, which latter are made from metallic zinc, and zinc-white is made from zinc-gray. The ground iron ore referred to is the iron just as it comes from the mine, ground to a flour.

The articles above mentioned and entering into the composition of my paint are mixed as hereinafter explained, and the resulting compound is designed to be applied with the brush in the usual manner.

In compounding my paint preparation I generally proceed in the following manner, to wit: The gum of shellac and the Burgundy pitch are cut or dissolved separately or together in the benzine. The coal-tar is then heated to the boiling-point, and the zinc, asbestus, silicate of soda, and ground iron ore are intimately mixed therewith by stirring them in a thorough manner. The shellac and Burgundy pitch solution is now added, and the preparation is completed and ready for use. It is apparent that the preparation may be thinned, if necessary, by adding sufficient of the liquid ingredients mentioned to bring the paint to a more liquid consistency. More or less of the volatile ingredients are driven off by the heat; but this in no way interferes with the efficacy or durability of the paint.

This compound is adapted to be applied to any building or article where its efficacy as a fire-proof or water-proof preservative would be indicated. By the addition of proper coloring pigments any degree of shade or color, except white of a lasting and brilliant character, may be produced.

What I claim as my invention, and desire to secure by Letters Patent, is—

The paint composition consisting of the following ingredients: zinc-gray, silicate of soda, ground hematite iron ore or its equivalent, benzine, shellac gum, Burgundy pitch, and coal-tar, compounded in the proportions and in the manner substantially as specified.

In testimony that I claim the above I have hereunto subscribed my name in the presence of two witnesses.

GEORGE J. CLINE.

Witnesses:
GEORGE W. RULE,
OSCAR BURKLEY.